UNITED STATES PATENT OFFICE.

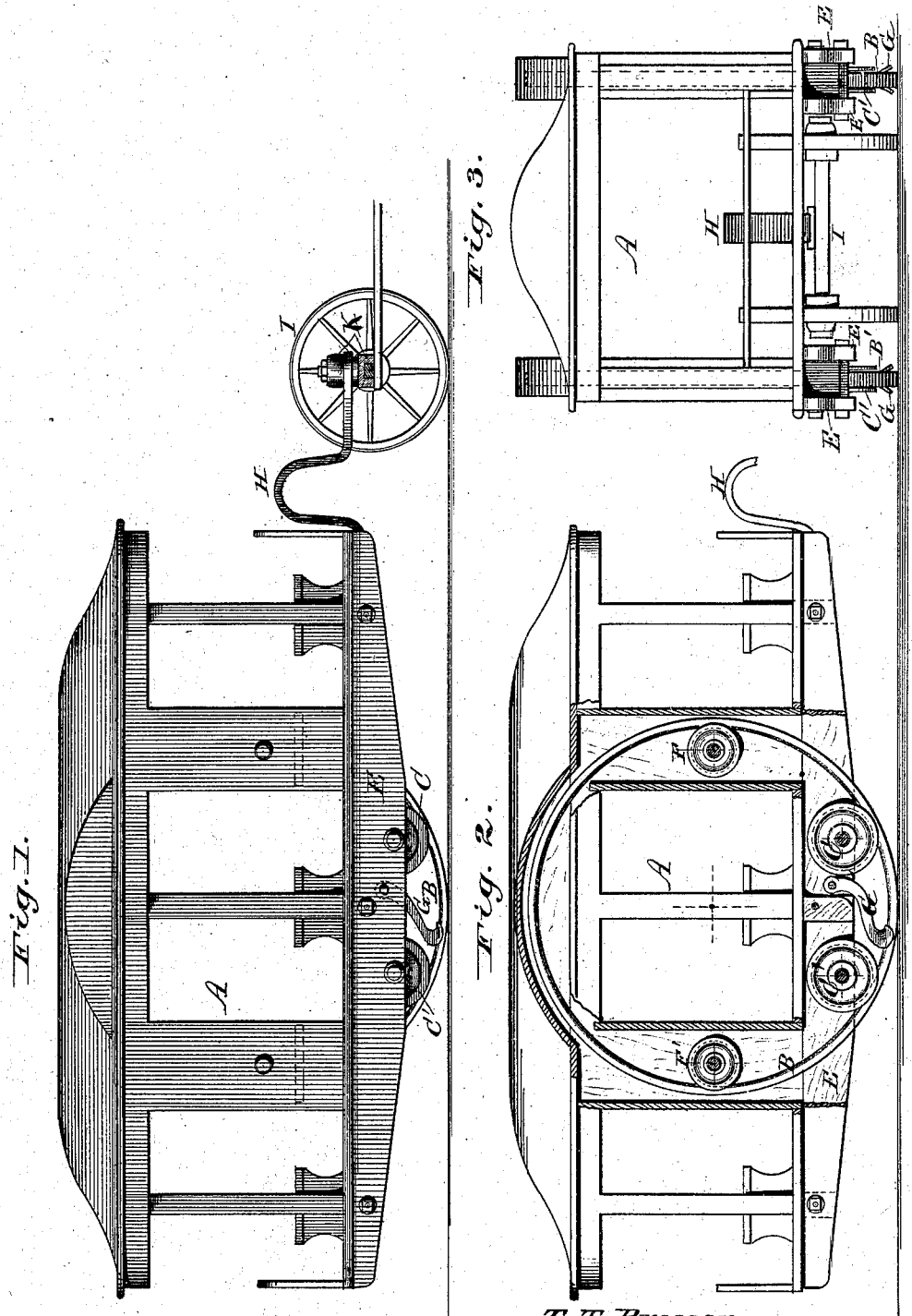

TREAT T. PROSSER, OF CHICAGO, ILLINOIS.

CAR FOR COMMON ROADS.

SPECIFICATION forming part of Letters Patent No. 224,727, dated February 17, 1880.

Application filed January 27, 1880.

*To all whom it may concern:*

Be it known that I, TREAT T. PROSSER, of Chicago, in the county of Cook and State of Illinois, have invented a new and useful Improvement in Street-Cars for Common Roads, of which the following is a full, clear, and exact description.

This invention relates to street-cars or other vehicles for running on common roads constructed with a pair of drive-wheels of very large diameter consisting of spokeless circular rails or endless tracks, on which the car is mounted through the medium of small truck-wheels running on the interior surface of such endless tracks.

My improvement consists of providing scrapers to keep the endless track free of mud, and so prevent the choking of the rear truck-wheels.

In the accompanying drawings, Figure 1 is a side elevation of a car having my improved scraper. Fig. 2 is also a side elevation, portions of the wood being broken away to expose the interior parts. Fig. 3 is a rear elevation.

The same letters of reference indicate like parts in all the figures.

The body A of the car is mounted centrally, so as to balance it as nearly as possible upon the large drive-wheels B and B', which receive the weight of the car from the two sets of truck-wheels C C', arranged to run on the interior surface of said drive-wheels, near their points of contact with the ground.

The drive-wheels are mere rings or circular tracks. The truck-wheels C C' are journaled in suitable bearings in the side sills, E, of the car-body. They are placed some distance apart, on opposite sides of a vertical line drawn through the center of the endless tracks, thus bringing the weight of the car upon the endless tracks at two points equidistant from the point of contact with the ground, in consequence of which the car is enabled to pass over small obstructions much more readily than a car of this kind having centrally-disposed truck-wheels.

Another advantage of this construction is that as the endless tracks will come in contact with an obstruction at a point not directly under either of the trucks, the shock will, by the elastic action of the tracks, be transmitted circularly and be felt by the car in a very slight degree.

The wheels C C' have a flanged tread to partially encompass the drive-wheels or circular tracks, so as to keep the latter in position.

Scrapers G are applied to keep the drive-wheels, and consequently the truck-wheels, free of mud and dirt. These scrapers consist of pendent arms loosely pivoted at their upper ends to the frame-work of the car, their lower ends being adapted to partially encompass the endless tracks between the points at which said tracks come in contact with the ground and the rear truck-wheels.

It will be seen that by this arrangement mud or dirt that would otherwise collect on the endless tracks and be carried up to the rear truck-wheels will be scraped off, thereby avoiding all danger of clogging said truck-wheels.

As this car is to be used on common roads, the advantage of these scrapers must at once be seen, for unless they are used, or some provision made of a like nature, the mud and dirt accumulating on the endless tracks would be carried up to the rear truck-wheels, and so choke or clog them that they would soon stop all motion, and thus prevent the smooth and even running of the endless tracks, which is of such great importance in using a conveyance of this description.

What I claim as my invention, and desire to secure by Letters Patent, is—

The combination, substantially as specified, of the drive-wheels or endless tracks, the supporting-trucks, and the scrapers.

In testimony whereof I have signed my name to the foregoing specification in the presence of two subscribing witnesses.

TREAT T. PROSSER.

Witnesses:
B. E. J. EILS,
CHAS. A. NEALE.